(12) United States Patent
Bennet et al.

(10) Patent No.: US 8,196,108 B2
(45) Date of Patent: *Jun. 5, 2012

(54) BREAKPOINT MANAGEMENT AND RECONCILIATION FOR EMBEDDED SCRIPTS IN A BUSINESS INTEGRATION LANGUAGE SPECIFIED PROGRAM PROCESS

(75) Inventors: Jonathan David Bennet, Markham (CA); Jane Chi-Yan Fung, Thornhill (CA); Grace Hai-Yan Lo, Thornhill (CA); William Gerald O'Farrell, Markham (CA)

(73) Assignee: International Business Machines Corporation, Armonk, NY (US)

( * ) Notice: Subject to any disclaimer, the term of this patent is extended or adjusted under 35 U.S.C. 154(b) by 441 days.

This patent is subject to a terminal disclaimer.

(21) Appl. No.: 12/269,338

(22) Filed: Nov. 12, 2008

(65) Prior Publication Data

US 2009/0125890 A1 May 14, 2009

Related U.S. Application Data

(62) Division of application No. 10/906,505, filed on Feb. 23, 2005, now Pat. No. 7,472,378.

(51) Int. Cl.
*G06F 9/44* (2006.01)

(52) U.S. Cl. ......... 717/124; 717/125; 717/127; 717/129
(58) Field of Classification Search ................. 717/124, 717/125, 127, 129
See application file for complete search history.

(56) References Cited

U.S. PATENT DOCUMENTS

| | | | |
|---|---|---|---|
| 6,249,907 B1 * | 6/2001 | Carter et al. ................. 717/129 |
| 2003/0149961 A1 * | 8/2003 | Kawai et al. ................. 717/129 |
| 2005/0096960 A1 * | 5/2005 | Plutowski et al. ............... 705/8 |

OTHER PUBLICATIONS

Li, et al. "BPEL4WS Unit Testing: Framework and Implementation", 2005, IEEE, p. 1-8.*

* cited by examiner

*Primary Examiner* — Qamrun Nahar
(74) *Attorney, Agent, or Firm* — Steven M. Greenberg, Esq.; Carey, Rodriguez, Greenberg & O'Keefe

(57) ABSTRACT

A method, system and apparatus for breakpoint management and reconciliation for business integration language specified programs. The system includes a business integration language development environment; debug tooling accessible through the environment; and, breakpoint management and reconciliation logic coupled to the debug tooling. The business integration language development environment includes a BPEL development environment cooperatively coupled to a BPEL engine. The debug tooling includes a script display for displaying textual portions of an embedded script; and, at least one other display selected from the group consisting of a graphical process flow display, a debug module display and a breakpoint module display.

19 Claims, 3 Drawing Sheets

BREAKPOINT MANAGEMENT AND RECONCILIATION FOR EMBEDDED SCRIPTS IN A BUSINESS INTEGRATION LANGUAGE SPECIFIED PROGRAM PROCESS

CROSS-REFERENCE TO RELATED APPLICATIONS

This application is a Divisional of U.S. application Ser. No. 10/906,505, filed Feb. 23, 2005, entitled "BREAKPOINT MANAGEMENT AND RECONCILIATION FOR EMBEDDED SCRIPTS IN A BUSINESS INTEGRATION LANGUAGE SPECIFIED PROGRAM PROCESS," which is incorporated herein by reference in its entirety.

BACKGROUND OF THE INVENTION

1. Field of the Invention

The present invention relates to the field of business integration language specified program debugging and more particularly to breakpoint management in a business integration language specified program debugging environment.

2. Description of the Related Art

The achievement of universal interoperability between applications by using Web standards remains the principal goal of Web Services. Web Services use a loosely coupled integration model to allow flexible integration of heterogeneous systems in a variety of domains including business-to-consumer, business-to-business and enterprise application integration. The following basic specifications originally defined the Web Services space: the Simple Object Access Protocol (SOAP), the Web Services Description Language (WSDL), and Universal Description, Discovery, and Integration (UDDI). SOAP defines an XML messaging protocol for basic service interoperability. WSDL introduces a common grammar for describing services. UDDI provides the infrastructure required to publish and discover services in a systematic way. Together, these specifications allow applications to find each other and interact following a loosely coupled, platform-independent model.

Presently, the interaction model that is directly supported by WSDL essentially can be viewed as a stateless model of synchronous or uncorrelated asynchronous interactions. Models for process interactions typically assume sequences of peer-to-peer message exchanges, both synchronous and asynchronous, within stateful, long-running interactions involving two or more parties. Nevertheless, systems integration requires more than the mere ability to conduct simple interactions by using standard protocols. The full potential of Web Services as an integration platform will be achieved only when applications and processes are able to integrate their complex interactions by using a standard process integration model.

Business integration languages such as the Business Process Execution Language (BPEL) fulfills some aspects of a standard process integration model. The BPEL for Web Services specification defines a technology for integrating cross-enterprise business processes. By coordinating stateful interactions of loosely coupled services across enterprise boundaries, BPEL technology provides a means of modeling the interactions between an enterprise and its business partners, suppliers and customers and thus the value chain of the enterprise.

Business integration languages like BPEL provide a language for the formal specification of business processes and business interaction protocols. By doing so, BPEL for Web Services extends the Web Services interaction model and enables the model to support business transactions. The basic concepts of BPEL can be applied in one of two ways. A BPEL specified process can define a business protocol role, using the notion of an abstract process. The relationship between two or more business protocol roles can be modeled as a partner link. Second, it is also possible to use BPEL to define an executable business process. In an executable business process, the logic and state of the process determine the nature and sequence of the Web Service interactions conducted at each business partner, and thus the interaction protocols.

Business integration languages such as BPEL often allow a script such as a Java script to be invoked within an activity defined within a business integration language specified program. Yet, when implemented, the script need not necessarily be defined in a separate file that can be accessed by debug tooling. For example, in the case of a Java script, though embedded in the business integration language specified document, the actual resulting Java class can be defined at runtime only in the form of a backing class (on the server side). In this case, the debugger can neither set nor enforce a breakpoint in the resulting backing class prior to runtime. Accordingly, one of the most fundamental utilities in the debugging environment cannot be applied when debugging aspects of a business integration language specified program.

BRIEF SUMMARY OF THE INVENTION

The present invention addresses the deficiencies of the art in respect to testing business integration language specified programs and provides a novel and non-obvious method, system and apparatus for breakpoint management and reconciliation for business integration language specified programs. In a system implementation of the present invention, the system can include a business integration language development environment; debug tooling accessible though the environment; and, breakpoint management and reconciliation logic coupled to the debug tooling. Notably, the business integration language development environment can include a BPEL development environment cooperatively coupled to a BPEL engine. Also, the debug tooling can include a script display for displaying textual portions of an embedded script; and, at least one other display selected from the group consisting of a graphical process flow display, a debug module display and a breakpoint module display.

A breakpoint management and reconciliation method can include establishing a symbolic breakpoint in source code for a script embedded in a business integration language specified program process. Subsequently, the symbolic breakpoint can be translated into an actual breakpoint for an operable form of the source code, and applied to the operable form of the source code. When a breakpoint is encountered, the encountered breakpoint can be matched to the symbolic breakpoint. In consequence, a portion of the source code associated with the symbolic breakpoint can be visually marked.

Preferably, the translating step can include inserting a query method into the operable form of the source code. In particular, the query method can return an actual line number for the operable form of the source code. A line number can be computed in the operable form of the source code which corresponds to a line number in the source code for the symbolic breakpoint. Subsequently, the computed line number and corresponding line number can be stored in a table.

The matching step can include determining if the program process containing the embedded script having the established symbolic breakpoint gave rise to the encountered breakpoint. If it is determined that the program process gave rise to the encountered breakpoint, locating the corresponding line number in the table. In this regard, the determining step can include identifying a thread pausing in consequence of the encountered breakpoint, and further identifying a thread invoking the program process containing the embedded script having the established symbolic breakpoint. Consequently, both can be compared to determine if the program process gave rise to the encountered breakpoint.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

The present invention is a breakpoint management system for use in a business integration language enabled debugging tool. In accordance with the present invention, breakpoints which have been applied within the debugging tool to a script embedded in a business integration language defined program can be translated to corresponding breakpoints in underlying logical code produced at runtime. The translations can be stored for subsequent cross-referencing. When a breakpoint is encountered during the course of debugging the business integration language defined program, the encountered breakpoint can be compared to the stored translations to identify a companion breakpoint in the script. Once identified, the debugging tool can visually mark the companion breakpoint in a text view of the script.

Figure 1:
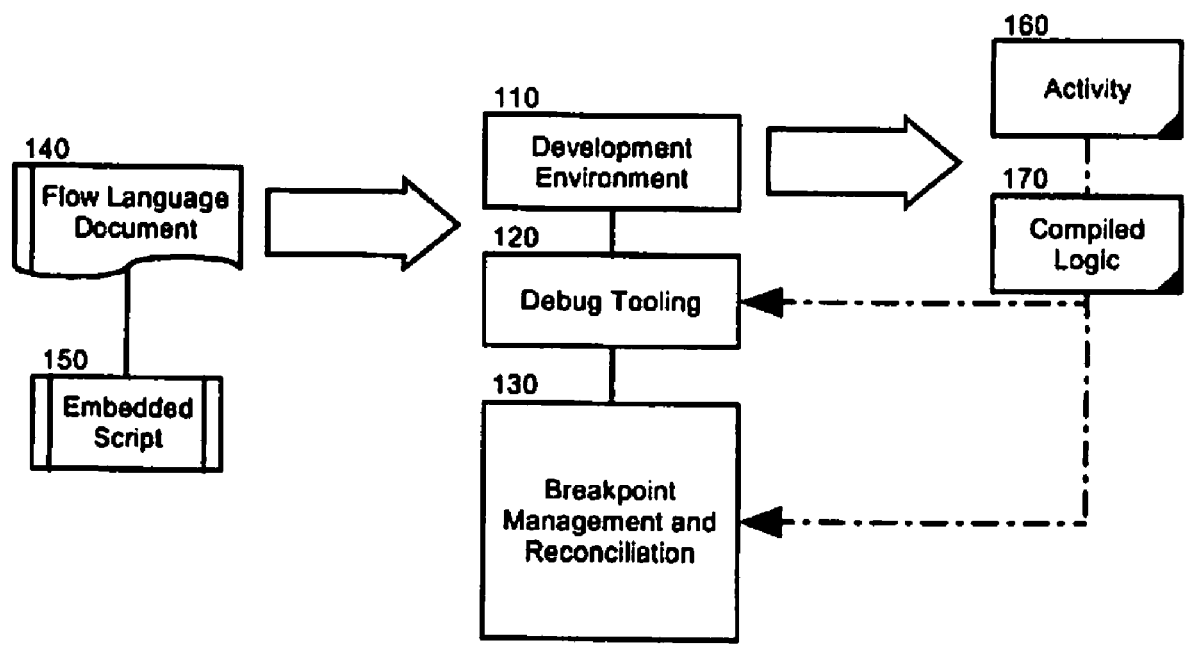
FIG. 1 is a schematic illustration of a system, method and apparatus for business integration language specified program debugging which has been configured to manage embedded script breakpoints in accordance with a preferred aspect of the present invention.

In further illustration, FIG. 1 is a schematic illustration of a system, method and apparatus for business integration language specified program debugging which has been configured to manage embedded script breakpoints. In the system of the present invention, a programmatic script 150 can be embedded in a business integration language specified program 140, for example a BPEL defined program. A development environment 110 can be configured to process the business integration language specified program 140 to produce both a flow activity 160 and operable logic 170 for the embedded script 150.

The development environment 110 can be coupled to a debug tooling 120 configured to manage debugging operations, such as the incremental execution of the activity 160 by way of trace into, step over and breakpoint commands. Debugging operations further can include variable inspection and variable watching to name just a few debugging operations which can be performed in the debug tooling 120. Notably, the debug tooling 120 also can be configured with breakpoint management and reconciliation logic 130.

The breakpoint management and reconciliation logic 130 can fulfill dual roles. First, the breakpoint management and reconciliation logic 130 can manage the establishment of one or more breakpoints in the embedded script 150 and corresponding breakpoints in the compiled logic 170. Second, the breakpoint management and reconciliation logic 130 can reconcile breakpoints encountered in the compiled logic 170 with corresponding breakpoints established in the embedded script 150.

In operation, a breakpoint can be established in the embedded script 150 through a visual interface provided by the debug tooling 120. Subsequently, when executing of the activity 160, the breakpoint management and reconciliation logic 130 can query the compiled logic 170 to locate a corresponding breakpoint in the compiled logic 170. The location of the symbolic breakpoint in the embedded script 160 and the actual breakpoint in the compiled logic 170 can be stored in a lookup table such as a hash table for later use.

When a breakpoint is encountered and the execution of the activity 160 pauses, the breakpoint management and reconciliation logic 130 can query the process engine handling the execution of the activity 160 to determine whether the breakpoint has occurred in the activity 160. If so, a lookup operation can be performed on the lookup table for the encountered breakpoint to identify a companion symbolic breakpoint. If a companion breakpoint can be identified, the relevant line in the embedded script 150 can be marked as the source of the encountered breakpoint in a visual display of the debug tooling 120.

Figure 2:
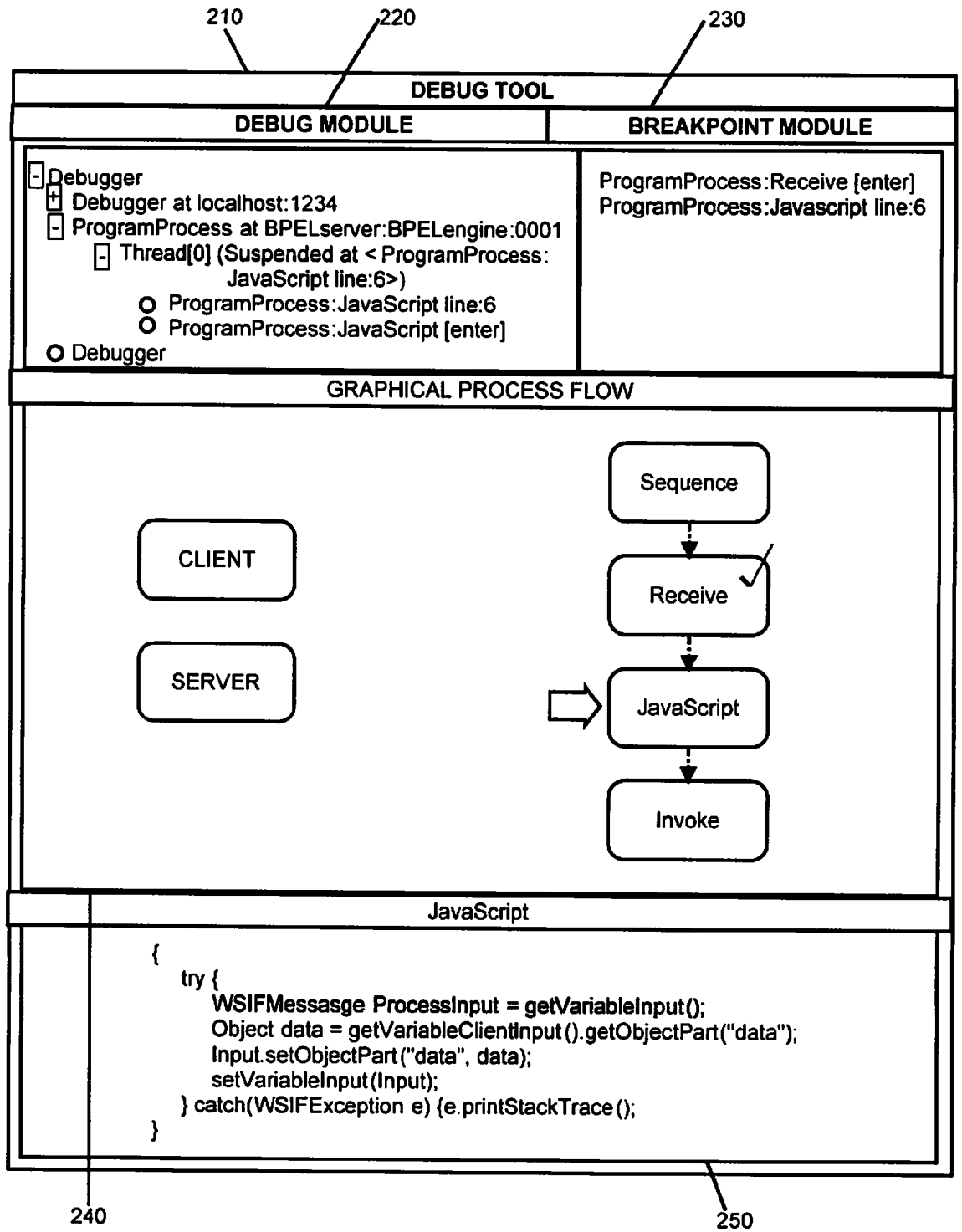
FIG. 2 is a pictorial illustration of a debugging tool configured to manage embedded script breakpoints in a business integration language specified program in the system of FIG. 1; and, FIG. 3 is a flow chart illustrating a process for breakpoint management in an embedded script in a business integration language specified program in the system of FIG. 1.

In more particular illustration of the visual display of the debug tooling 120, FIG. 2 is a pictorial illustration of a debugging tool configured to manage embedded script breakpoints in a business integration language specified program in the system of FIG. 1. As shown in FIG. 2, the debug tool 210 can include a debug module display 220, a breakpoint module display 230, a graphical process flow display 240 and a script code display 250. While the particular example shown in FIG. 2 relates to the debugging of a BPEL program incorporating embedded Java script, the skilled artisan will recognized that the invention is not so restricted to the particularities of BPEL and Java and the principle of the invention is not to be limited to any particular process business integration language or scripted programming language.

Referring first to the debug module display 220, the debug module display can include a rendering of a hierarchy of program processes associated with a particular program process, including the debug process managed by the debug tool 210. The program processes, whether local or remote in terms of host computing device, can include a sub-listing of different threads of execution supporting the operation of activities defined by the program processes. The breakpoint module display 230, unlike the debug module display 220, can display instances of breakpoints which have been established for lines of code which have been embedded in an activity for one or more program processes.

The graphical process flow display 240 can include a graphical rendering of the flow of operation for a particular activity in a program process. A graphical marker can indicate the progress of operation and can denote a current task location in the process flow. Finally, a script code display 250 can include a code listing for script which has been embedded in the activity. Significantly, when a breakpoint has been encountered which can be reconciled to an established breakpoint in the embedded script, the line of code in the script reconciled to the encountered breakpoint can be marked, highlighted or otherwise visually demarcated to illustrate the current debug location of the program process. Conversely, a breakpoint can be established for code displayed in the script code display 250.

When a breakpoint is established for a line of code in the script code display 250, the debug tool 210 can store the line number of the script where breakpoint is requested. Also, the breakpoint can be noted in the breakpoint module display 220. When the program process is deployed, the programmatic logic for the script can be generated, for example in the form of a backing class. The programmatic logic also can be generated to include a method for returning the absolute line number of the method corresponding to the script. In this way, the line number of the method can be retrieved at runtime.

Figure 3:
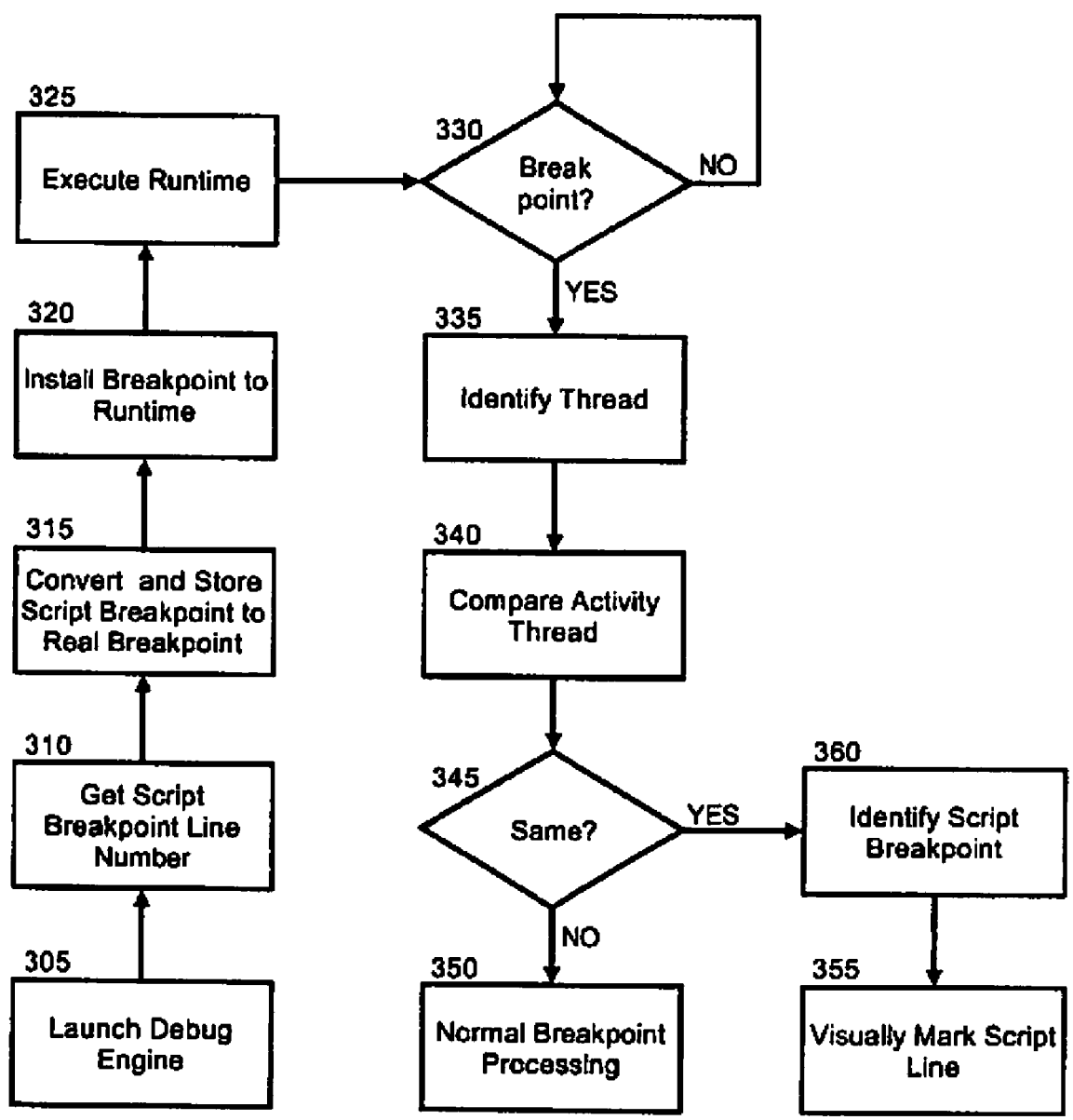

At runtime, the breakpoint established for the script can be applied to a resulting operable form of the generated programmatic logic. In this way, when the breakpoint is encountered, the encountered breakpoint can be reconciled with the breakpoint location in the script. In more specific illustration, FIG. 3, a flow chart is shown which illustrates a runtime process for breakpoint management in an embedded script in a business integration language specified program in the system of FIG. 1.

Beginning in block 305, the debug engine can be launched and in block 310, the runtime engine for the activity can be queried to obtain the actual line number of the logic corresponding to the embedded script. In block 315, the location of the requested breakpoint in the embedded script can be translated to an identified line number of the corresponding logic in the operable form of the generated programmatic logic and stored in a translation table. Subsequently, in block 320 an actual breakpoint can be set at the identified location and in block 325 the operable form of the generated programmatic logic can be executed.

In decision block 330, if an actual breakpoint is encountered, in block 335 the thread which has paused in consequence of the encountered breakpoint can be identified (by querying process engine). In block 350, the identity of the thread can be compared to the identity of the thread known to have invoked the activity. In decision block 345, if the threads do not compare, in block 350 normal breakpoint processing can proceed. Otherwise, in block 360 the script breakpoint can be determined by reference to the translation table. Consequently, in block 355 the relevant line number of the symbolic breakpoint can be marked in a code listing for the embedded script to indicate that the breakpoint has been encountered.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A breakpoint management and reconciliation computer system for business integration language specified programs, the system comprising:
   a business integration language development environment;
   debug tooling accessible though said environment; and,
   breakpoint management and reconciliation processor coupled to said debug tooling, the breakpoint management and reconciliation processor being configured to perform
   establishing symbolic breakpoints in source code for a script embedded in a business integration language specified program process;
   translating the symbolic breakpoints into corresponding actual breakpoints for an operable form or the source code, and applying the actual breakpoints to the operable form of said source code;
   storing the symbolic breakpoints and the corresponding actual breakpoints in a translation table;
   encountering an actual breakpoint during execution of the operable form of the source code and matching the encountered actual breakpoint to a corresponding symbolic breakpoint by referencing the translation table; and,
   visually marking a portion of the source code associated with the matched symbolic breakpoint.

2. The system of claim 1, wherein said business integration language development environment comprises business process execution language (BPEL) development environment cooperatively coupled to a BPEL engine.

3. The system of claim 1, wherein said debug tooling comprises:
   a script display for displaying textual portions of the script embedded in the source code of the business integration language specified program; and,
   at least one other display selected from the group consisting of a graphical process flow display, a debug module display and a breakpoint module display.

4. The system of claim 3, wherein:
   the script module visually demarcates a location in the source code on reconciling its corresponding breakpoint to an encountered breakpoint.

5. The system of claim 3, wherein the debug module display renders a hierarchy of program processes associated with the business integration language specified program.

6. A breakpoint management and reconciliation computer-method comprising the steps of:
   establishing symbolic breakpoints in source code for a script embedded in a business integration language specified program process,
   translating said symbolic breakpoints into corresponding actual breakpoints for an operable form of said source code, and applying said actual breakpoints to said operable form of said source code;
   storing the symbolic breakpoints and the corresponding actual breakpoints in a translation table;
   encountering an actual breakpoint during execution of the operable form of the source code and matching said encountered actual breakpoint to a corresponding symbolic breakpoint by referencing the translation table; and,
   visually marking a portion of said source code associated with said matched symbolic breakpoint.

7. The method of claim 6, wherein said translating step comprises the steps of:
   inserting a query method into said operable form of said source code, said query method returning an actual line number for said operable form of said source code;
   computing a line number in said operable form of said source code which corresponds to a line number in said source code for said symbolic breakpoint; and,
   storing said computed line number and corresponding line number in the translation table.

8. The method of claim 7, wherein said matching step comprises the steps of:
   determining if said program process containing said embedded script having said established symbolic breakpoint gave rise to said encountered breakpoint; and,
   if it is determined that said program process gave rise to said encountered breakpoint, locating said corresponding line number in said translation table.

9. The method of claim 8, wherein said determining step comprises the steps of:
   identifying a thread pausing in consequence of said encountered breakpoint;
   further identifying a thread invoking said program process containing said embedded script having said established symbolic breakpoint; and,
   comparing both of said identified threads to determine if said program process gave rise to said encountered breakpoint.

10. The method of claim 6, further comprising the step of displaying a hierarchy of software program processes for the business integration language specified program process.

11. The method of claim 6, wherein the steps are performed in an environment comprising business process execution language (BPEL) development environment cooperatively coupled to a BPEL engine.

12. The method of claim 6, wherein the steps are performed for debugging the business integration language specified program process.

13. A computer storage device having stored thereon a computer program for breakpoint management and reconciliation, the computer program comprising a routine set of instructions which when executed by a computer cause the computer to perform the steps of:
   establishing symbolic breakpoints in source code for a script embedded in a business integration language specified program process;
   translating said symbolic breakpoints into corresponding actual breakpoints for an operable form of said source code, and applying said actual breakpoints to said operable form of said source code;
   storing the symbolic breakpoints and the corresponding actual breakpoints in a translation table;
   encountering an actual breakpoint during execution of the operable form of the source code and matching said encountered actual breakpoint to a corresponding symbolic breakpoint by referencing the translation table; and,
   visually marking a portion of said source code associated with said matched symbolic breakpoint.

14. The compute storage device of claim 13, wherein said translating step comprises the steps of:
   inserting a query method into said operable form of said source code, said query method returning an actual line number for said operable form of said source code;
   computing a line number in said operable form of said source code which corresponds to a line number in said source code for said symbolic breakpoint; and,
   storing said computed line number and corresponding line number in the translation table.

15. The computer storage device of claim 14, wherein said matching step comprises the steps of:
   determining if said program process containing said embedded script having said established symbolic breakpoint gave rise to said encountered breakpoint; and,
   if it is determined that said program process gave rise to said encountered breakpoint, locating said corresponding line number in said table.

16. The computer storage device of claim 15, wherein said determining step comprises the steps of:
   identifying a thread pausing in consequence of said encountered breakpoint;
   further identifying a thread invoking said program process containing said embedded script having said established symbolic breakpoint; and,
   comparing both of said identified threads to determine if said program process gave rise to said encountered breakpoint.

17. The computer storage device of claim 14, further comprising the step of displaying a hierarchy of software program processes for the business integration language specified program process.

18. The computer storage device of claim 14, wherein the steps are performed in an environment comprising business process execution language (BPEL) development environment cooperatively coupled to a BPEL engine.

19. The computer storage device of claim 14, wherein the steps are performed for debugging the business integration language specified program process.

* * * * *